United States Patent [19]

Lorinet et al.

[11] 3,769,914
[45] Nov. 6, 1973

[54] SPEED SYNCHRONIZING CONTROL ARRANGEMENT FOR TRANSPORT SYSTEMS

[75] Inventors: Jean-Paul Philippe Lorinet, Grenoble; Francois Lagier, Seyssinet; Bernard Bobineau, Grenoble, all of France

[73] Assignee: Marlin Gerin, Societe Anonyme, Grenoble, France

[22] Filed: Nov. 29, 1971

[21] Appl. No.: 202,824

[52] U.S. Cl..... 104/148 LM, 104/26 R, 246/182 A, 104/18
[51] Int. Cl............................................. B61k 1/00
[58] Field of Search ................... 198/76, 78, 79, 80, 198/81; 188/82, 82.8, 134; 104/18, 19, 20, 26 R, 26 A, 147, 148 LM, 149, 162, 172, 173, 184, 202, 229; 246/182 A

[56] References Cited
UNITED STATES PATENTS

| 2,404,984 | 7/1946 | Powers | 104/148 LM |
|---|---|---|---|
| 3,447,650 | 6/1969 | Dossier | 188/82.8 |
| 3,315,612 | 4/1967 | Reid | 104/20 |
| 2,905,100 | 9/1959 | Kendall | 198/76 |
| 3,483,829 | 12/1969 | Barry | 104/18 |

Primary Examiner—Gerald M. Forlenza
Assistant Examiner—D. W. Keen
Attorney—Richard K. Stevens et al.

[57] ABSTRACT

An automatic control arrangement for synchronizing the speed of a linear induction motor-driven vehicle with the speed of an independently driven body, such as a movable arrival or departure platform. A unidirectional clutch mechanism, such as freewheel device, holds back the accelerating vehicle as soon as it has reached the speed of the platform.

10 Claims, 7 Drawing Figures

3,769,914

SPEED SYNCHRONIZING CONTROL ARRANGEMENT FOR TRANSPORT SYSTEMS

The present invention relates to a control arrangement for synchronizing the speeds of linearly movable bodies comprising a linear electric motor for driving one of said bodies, for instance a vehicle and a device for driving the other vehicle at a predetermined speed.

The difficulties of regulating the speed of bodies or vehicles propelled by a linear motor and thus assuring the synchronous displacement of two movable bodies in a transportation system of this kind are known. In transportation or handling systems with continuously moving drive members to which the vehicles are coupled, it is advisable to assure the synchronization of the speed of the vehicle with the speed of the drive member prior to the clutching so as to avoid any relative sliding which might cause jolts or substantial wear. A similar problem of synchronizing displacements arises in systems for the transfer of a load from one vehicle towards another or towards a dynamic platform during the course of travel. It is known that the losses in time at the stations may be substantially reduced by providing a simple deceleration of the vehicles, the loading and unloading taking place during the travel at reduced speed on a low speed conveyor, an apron or a dynamic platform rolling parallel to the path of travel or operating beside the slowly moving vehicle. Requirements of safety make necessary synchronous speed of the moving belt and the vehicle, which will be fully retained whatever the load or conditions of operation. Electric devices for regulating the thrust of linear motors are complicated and expensive.

The object of the present invention is to overcome the drawbacks of said devices and to permit drive by an electric linear motor while assuring perfect synchronism of travel with another vehicle or a movable body by means which are particularly simple and reliable.

The synchronization of the movable bodies is performed according to the present invention by a unidirectional coupling or mechanical clutch between the bodies which prevents the linear motor driven body from overrunning the other body. The thrust of the linear motor is adapted to make the coupling device active in the region of synchronous travel of the bodies so as to impose the same speed of travel on the bodies.

The unidirectional coupling device which imposes a braking on the vehicles driven by the linear motor during travel in synchronism can cooperate directly with the other movable body which is arranged, for instance, in the form of an endless belt or traveling apron, or with an associated member of the chain or belt type moving at a synchronous speed.

The unidirectional coupling device may have retractable stops or a freewheel system or any similar system which is well known to those skilled in the art.

Another object of the invention is to provide a dynamic loading platform system for linear motor driven vehicles.

A further object of the invention is to provide an in-station control sytem for the movement of vehicles within a station area.

Still another object of the invention is to provide a safety brake device on the vehicles in the stations.

Another object of the invention is to provide an advantageous arrangement for controlling the capacity of a transport system by an automatic control of the speed of the vehicles in the station.

Other advantages and characteristics of the invention will become evident from the following description of two embodiments of the invention, which are shown in the accompanying drawings in which.

Figure 1:
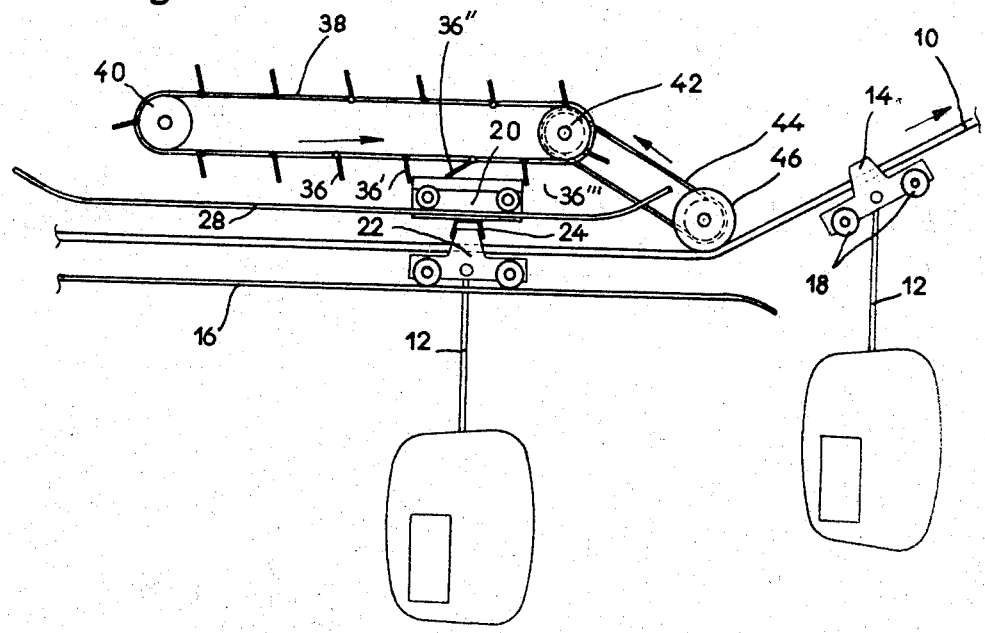
FIG. 1 is a schematic view in elevation of an acceleration system of an end station of a telpher provided with a synchronization device in accordance with the invention, the inductor elements of the motor being removed.
Figure 2:
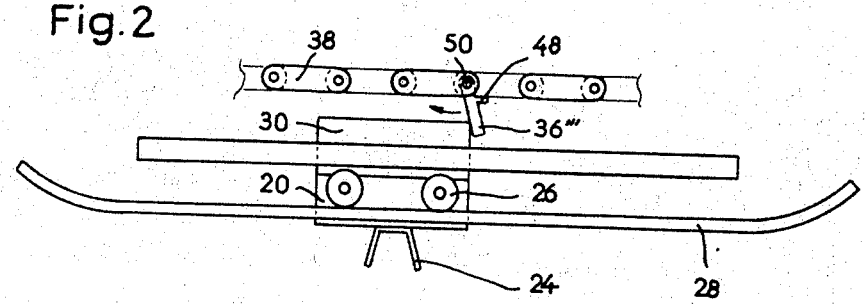
FIG. 2 is a partial view on a larger scale of FIG. 1, illustrating the drive device for the acceleration carriage, only the active lug being shown.
Figure 3:
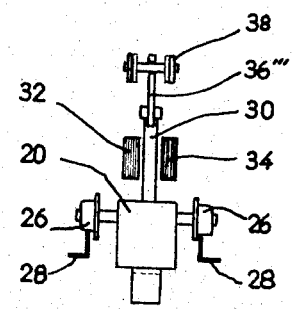
FIG. 3 is a righthand view of FIG. 2.

In FIGS. 1 to 3, an aerial cable transportation installation imparting a continuous movement of travel comprises an end station in which loads 12 are capable of being coupled to the cable in order to be displaced and transported towards another station (not shown). The installation may be a telpher with a single supporting and drive cable 10 on which the cabins 12 are engaged by coupling clamps 14 or a stationary supporting rail or cable system comprising a cable for driving the cabins along the supporting cable. In the end stations of the installation, the loads or cabins 12 are uncoupled from the cable 10 and taken over by tracks 16 on which they move supported by rollers 18 which are rigidly connected with the clamp 14. The disengaged cabins 12 move, after braking, in front of a disembarkation platform, where they possibly stop so that the passengers may get out and are then brought towards an embarkation platform before they are accelerated and again connected firmly to the cable 10. On the travel circuits in the stations, the cabins 12 are independent from the continuously moving cable 10 and their propulsion is assured by gravity, manually or by mechanical or electrical drive system. The main travel track comprises one or more sidings for the removal and storage of the cabins.

Such installations are well known and the accompanying figures show merely the region of acceleration and coupling of the cabins 12 onto the cable 10. The cabin 12 which travels on the track 16 engages upon leaving the embarkation platform (not shown) under an acceleration carriage 20, the support of the clamp 14 automatically being coupled to the carriage 20 by the insertion of a protrusion 22 into a mating recess 24 in the chassis of the carriage 20. Any other method of attachment can, of course, be used. The carriage 20 comprises two pairs of rollers 26 rolling on a track consisting of two angle irons 28 and extending parallel to the track 16 along the acceleration section, and a longitudinal plate 30 fastened to the upper part of the chassis. The plate 30 which consists of conductive material moves within a gap provided between two inductor or field magnet elements 32 and 34 which are stationary and rigidly connected to the track 28 (see FIGS. 2 and 3) and are capable of producing a sliding magnetic field. The plate or armature 30 forms together with the inductor elements 32 and 34 a linear induction motor for the propulsion of the acceleration carriage 20 along the track 28.

The carriage 20 can cooperate, for instance via the upper end of the armature plate 30, with lugs 36, 36', 36'', 36''', etc., articulated on links of an endless chain 38 the lower strand of which extends parallel to the tracks 16 and 28. The chain 38 is stretched between two reversing pulleys 40 and 42, one of which, 42, is driven in rotation by a belt transmission 44 which obtains its movement from the cable 10 via a roller 46 which may be one of the rollers of the end pillar of the installation. The chain 38 is driven at a speed synchronous with that of the cable 10 and the lower strand moves in the same direction as the cable. The lugs 36, 36', 36'', 36''', etc., which are staggered along the chain 38 are articulated on the pins 50 of the links and comprise a heel 48 which limits their swing in the direction opposite that of the arrow in FIG. 2. The lugs are thus capable of moving away from the path of the accelerating carriage 20 by pivoting in the direction indicated by the arrow.

The ends of the rail 28 are turned up in order to facilitate and permit the coupling and uncoupling of the cabin to and from the accelerating carriage 20, although any other system of locking can be used. The engagement on the cable 10 of the clamp 14 takes place at the end of the path of the carriage 20 by ordinary means which do not form part of the present invention and will therefore not be described.

The installation in accordance with the invention operates in the following manner: the cable 10 is imparted a continuous movement in the direction indicated by the arrow in FIG. 1 and it drives the chain 38 via the transmission 44 at a synchronous speed in the direction indicated by the arrow which corresponds to the direction of travel of the cabins 12. The carriage 20 is in starting position at the end of the rail 28 in the lefthand part of FIG. 1 waiting. When a cabin 12 appears on the acceleration section, the protrusion 22 engages below the coupling recess 24 of the carriage 20 and causes the locking of the cabin 12 on the accelerating carriage 20. A detector for the presence of the cabin 12 controls the feeding with current of the inductors 32 and 34 which exert a driving thrust on the armature 30 and the carriage 20. The assembly consisting of the carriage 20 and the cabin 12 is accelerated under the action of the linear motor so as rapidly to reach, before the point of engagement on the cable 10, a speed which is equal to that of the cable 10 whatever the load carried. In its movement the carriage 20 engages under the lower strand of the chain 38 which moves in the same direction at a speed equal to that of the cable, that is to say higher than that of the carriage 20 during the acceleration phase. This displacement of the chain 38 at a higher speed is permitted by a folding back of the lugs (see, for instance, the lug 36'' in FIG. 1). In the event that and as soon as the carriage 20 tends to move more rapidly than the chain 38, it, on the other hand, strikes against the lug 36''' which precedes it and holds it back. The action of the linear motor maintains the carriage 20 resting against the lug 36''' until the end of the stroke and the mechanical connection between the lug 36''', the chain 38 and the transmission 44 assures perfect synchronization of the displacements of the carriage 20 and therefore of the cabin 12 and the cable 10, facilitating the coupling on the cable. The lifting of the end of the rail 28 causes the uncoupling of the cabin 12 from the carriage 20.

Any desired device returns the carriage 20 into starting position for a new launching maneuver, the displacement in this direction not being hampered by the lugs 36, 36', 36'', 36''', etc., which continue their movement, moving away. The linear motor 32, 34 is preferably employed for this purpose by reversing the direction of the thrust by interchange of two phases.

It is easy to see that numerous variant embodiments of the invention can be used, particularly one in which the intermediate acceleration carriage 20 is eliminated, the action of the linear motor taking place directly on the support carriages 14 of the cabins which bear or constitute the armature element of the linear motor. There results from this a simplification of the system for the acceleration and driving of the cabins the travel of which on the tracks is advantageously assured in a particularly simple manner by linear motors staggered along the tracks, an armature element being associated with each cabin. Depending on the type of installation, an intermediate carriage system or a direct propulsion will be selected.

Figure 4:
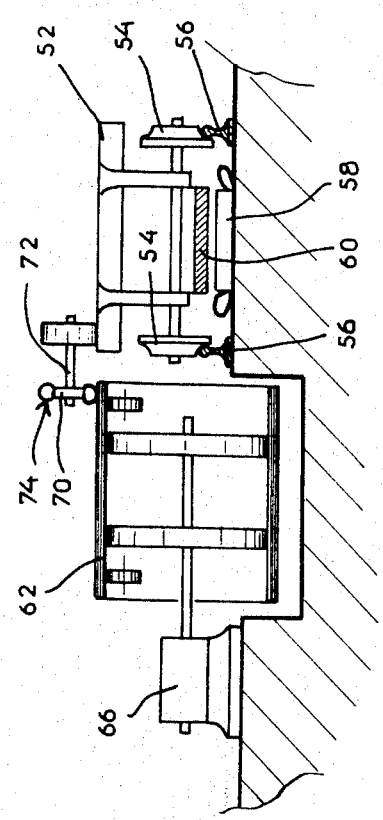
FIG. 4 shows schematically in side view a variant embodiment of the invention in a dynamic loading platform installation.
Figure 5:
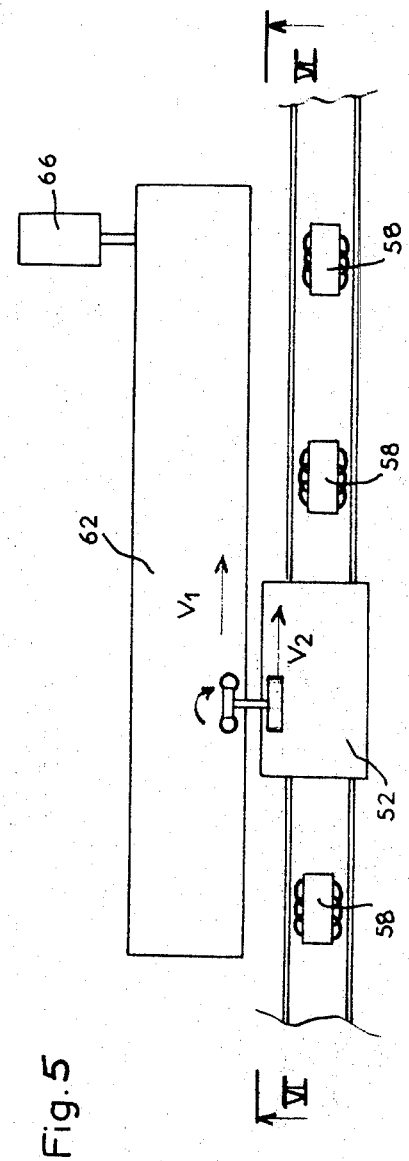
FIG. 5 is a plan view of the installation of FIG. 4.
Figure 6:
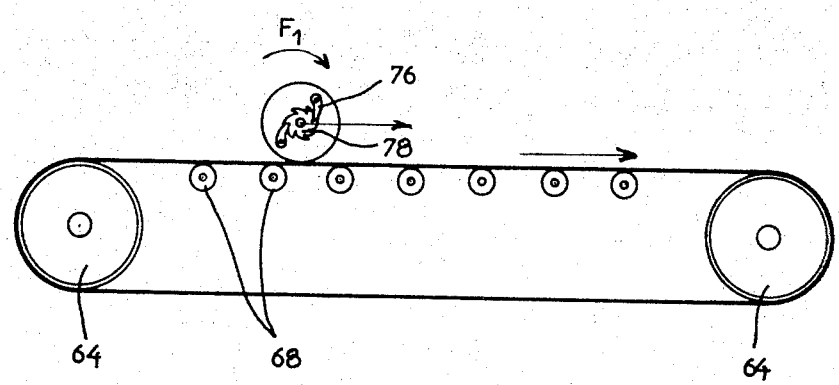
FIG. 6 is a section along the line VI—VI of FIG. 5.

In FIGS. 4 to 6, a variant of the invention has been shown in which a vehicle 52 with wheels 54 rolls on rails 56 under the action of linear induction motors the field magnets 58 of which are staggered along the track formed of the rails 56. The vehicle 52 bears an armature plate 60 arranged opposite the field magnet element 58 so as to be subjected to a force of propulsion in a manner known per se. The vehicle 52 can, of course, be suspended or supported by different means, for instance by fluid or magnetic cushions, and the linear motor may be of the on-board type, the armature of which is in a known manner rigidly connected with the track. The embarkation and disembarkation of passengers into and from the vehicle 52 take place in motion in the stations, the transfer of the passengers being facilitated by a traveling apron or belt 62 which constitutes a traveling platform moving at the speed of the vehicle 52. In the example shown in FIGS. 4 to 6, the traveling apron 62 is formed of a flexible belt stretched between two end rollers 64 and driven by a motor 66, for instance an electric motor. The active strand of the traveling of rolling apron is supported in a known manner by rollers 68 or similar systems.

A friction wheel 70 is mounted for rotation on a horizontal shaft 72 borne by the vehicle 52, the tread 74 of the wheel 70 frictionally engaging the traveling belt 62. It is easy to see that in case of a zero relative speed between the vehicle 52 and the belt 62, the wheel 70 will not turn around its shaft 72. Any differential speed, on the other hand, results in rotation of the friction wheel 70 in one direction or the other, depending upon whether the speed of the vehicle 52 is greater or less than that of the belt 62. A unidirectional coupling, schematically represented in FIG. 6 by a pawl system 76, firmly connected with the friction wheel 70 cooperating with a notched wheel 78 keyed onto the shaft 72, prevents the rotation of the friction wheel 70 in a direction corresponding to the clockwise rotation represented by the arrow $F_1$ in FIG. 6. In the case of a speed of travel $V_1$ of the belt 62 greater than that $V_2$ of the vehicle 52, the friction wheel 70 turns freely around its shaft 72, the pawl system 76, 78 permitting this free rotation. If, on the other hand, the speed of the vehicle 52 tends to exceed that of the belt 62, the pawls 76 engage in the notches 78 and block the freewheel of the friction wheel 70. This blocking causes a coupling of the vehicle 52 with the belt 62 which move in synchronism.

The tread 74 of the friction wheel 70 may be a pneumatic tire or any other system, for instance a notched or toothed wheel cooperating with corresponding teeth provided on the belt 62. The frictin wheel 70 can also cooperate with a strand or chain driven in synchronism with the belt 62.

The transportation installation in accordance with the invention operates in the following manner:

The vehicles 52 are decelerated, for instance by linear induction braking motors or any system of brakes before their entrance into the station so as always to enter the zone of reduced speed of travel at a speed less than that of the belt 62. The difference in speed between the speed $V_1$ of the belt 62 and the speed $V_2$ of the vehicle 52 causes a rotation of the friction wheel 70 when it comes into contact with the belt, this rotation taking place in opposite direction to the arrow $F_1$. The linear motors 58 of the station are arranged to accelerate rapidly the vehicle 52 and bring its speed $V_2$ to a value equal to the speed $V_1$ of the belt 62. The unidirectional coupling 76, 78 enters into action as soon as the speed $V_2$ is equal to the speed $V_1$ of the belt 62 and rigidly couples the vehicle and the belt which move in synchronism during the disembarkation and embarkation of the passengers. The thrust supplied by the linear motors 58 to the vehicle 52 must, of course, be sufficient to maintain said speed, the belt 62 acting as brake and as regulator for the speed of travel of the vehicle 52. The drive system 66 of the belt 62 may comprise a speed governor (not shown) which maintains the speed of travel $V_1$ constant despite the additional action due to the linear motors 58. In a simplified system, the inertia of the assembly can be sufficient to dampen the variations in speed which are due to the action of the motors 58 to acceptable values.

Figure 7:
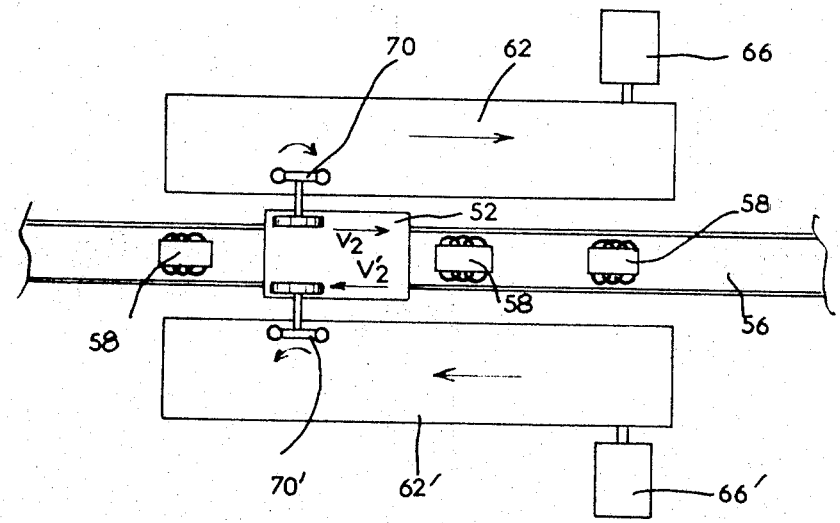
FIG. 7 is a view similar to that of FIG. 5 showing an installation with vehicles capable of traveling in both directions on a single track.

FIG. 7 shows an installation in accordance with the invention having a single track which is capable of receiving vehicles traveling in both directions. On both sides of the track 56 there are arranged rolling belts or rolling platforms 62, 62' driven by motors 66, 66' in opposite directions of travel. The vehicle 52 which is propelled by the linear motors 58 bears two friction wheels 70, 70' capable of cooperating with the rolling belt 62, 62' respectively and with freewheels active in opposite directions. In one direction of travel of the vehicle 52 indicated by the arrow $V_2$ in the figure corresponding to the direction of movement of the belt 62, the speed of the vehicle is limited to the speed of the belt by the entrance into action or blocking of the freewheel associated with the friction wheel 70 in the manner described above. The friction wheel 70' cooperating with the opposite belt 62' turns freely and is therefore inactive. In the case of a vehicle 52 traveling in the direction $V'_2$, the limiting of the speed is conversely effected by the friction wheel 70' so as to synchronize the speed of the vehicle 52 with that of the belt 62' which serves as embarkation and disembarkation platform. The friction wheel 70 is on the other hand inactive.

The system of the unidirectional coupling between the vehicle and the rolling belt can, of course, be developed in any other manner, for instance by systems of stops or systems of pawls cooperating with a rack and similar devices. The rolling platform may be limited to a movable platform or to a carriage which moves parallel to the vehicle in the zone of travel at reduced speed and is diverted subsequently onto a different path for the disembarkation or possibly the forwarding to another destination.

The capacity of the installation can be regulated while maintaining the duration of the run between the stations by modifying the circulation time of the vehicles in the stations. This circulation time at reduced speed, can be regulated without modification of the thrust of the linear motors 58 by varying the speed of drive of the rolling platform 62 which automatically imposes a corresponding speed on the vehicle 52.

The traveling belt 62 provides a safety device for braking a vehicle 52 which enters a station at a speed of travel greater than the speed of the belt 62. The friction wheel 70 engages the belt 62 and the freewheel 76, 78 being blocked slips and brakes up the vehicle 52.

The invention is, of course, in no way limited to the embodiment which has been more particularly described and shown by way of example in the accompanying drawings, but rather extends to any variant which falls within the scope of electrical or mechanical equivalence.

We claim:

1. An automatic speed limiting arrangement comprising:
   a. a vehicle movable along a linearly extending track;
   b. an endless belt means traveling at a predetermined speed along a section of said track longitudinally thereof and adjacent thereto;
   c. a linear induction-motor means for propelling said vehicle past said belt means; and
   d. a one-way mechanical coupling means operative in said section between said vehicle and said belt means for causing said belt means to retain said vehicle as soon as said vehicle reaches said predetermined speed within said section to limit the speed thereof to the value of said predetermined speed while permitting said vehicle to speed up freely to said predetermined speed.

2. An arrangement according to claim 1 in which said one-way mechanical coupling means comprises a plurality of projections pivotally mounted on said belt means and regularly spaced apart longitudinally of said belt means, said projections being adapted to engage said vehicle as soon as said vehicle, moving within said section, tends to move faster than said belt means and to ride over said vehicle as long as said vehicle moves slower than said belt means.

3. An arrangement according to claim 1 in which said one-way mechanical coupling means comprises a free wheel clutch means.

4. An arrangement according to claim 3 in which said free wheel clutch means is mounted on said vehicle and comprises an outer rotatable member for frictional engagement with said belt means.

5. An automatic speed limiting arrangement comprising:
   a. a vehicle movable along a linearly extending track;
   b. a movable body means traveling at a predetermined speed along a distinct section of said track;
   c. a linear induction-motor means for propelling said vehicle past said section; and d. a one-way mechanical coupling means operative between said vehicle and said body means as soon as said vehicle enters said section and until said vehicle leaves said section for limiting the speed of said vehicle within said section to the value of said predetermined speed by retaining said vehicle with said body means while permitting said vehicle to run freely as long as the speed thereof is lower than said predetermined speed.

6. An automatic speed limiting arrangement comprising:
   a. a vehicle movable along a linearly extending track;
   b. a movable body means traveling at a substantially constant speed along a portion of said track;
   c. a linear induction-motor means for propelling said vehicle past said portion; and
   d. a one-way mechanical coupling means operative between said vehicle and said body means as said vehicle travels along said section for causing said body means to retain said vehicle to limit the speed thereof to said substantially constant value while permitting said vehicle to run freely as long as the speed thereof is lower than said constant value.

7. An automatic speed limiting arrangement comprising:
   a. a vehicle movable along a linearly extending track;
   b. a movable body means traveling at a predetermined speed along a distinct portion of said track;
   c. a linear induction-motor means for propelling said vehicle past said portion; and
   d. a one-way mechanical coupling means operative within said portion between said vehicle and said body means substantially independently of the portion of said vehicle relative to said body means throughout said portion for limiting the maximum speed of said vehicle to said predetermined speed while permitting said vehicle to run freely as long as the speed thereof is lower than said predetermined speed.

8. A transportation system comprising:
   a. a traction cable moving at a predetermined speed along a track;
   b. a vehicle guided and driven along said track;
   c. a station at a point of said track;
   d. a clamp means movable with said vehicle to uncouple said vehicle from said cable at said station and to subsequently couple said vehicle to said cable in a vehicle driving relation;
   e. a movable body means traveling at substantially said predetermined speed along a portion of said track at the exit of said station;
   f. a linear induction-motor means for propelling said vehicle past said portion of said track after uncoupling of said vehicle from said cable; and
   g. a one-way mechanical coupling means operative between said vehicle and said body means for limiting the maximum speed of said vehicle driven by said linear induction-motor means substantially to said predetermined speed to permit coupling of said vehicle with said cable in synchronous speed relation therewith.

9. A transportation system according to claim 8 in which said traction cable comprises an aerial cable, said vehicle comprises a telpher car suspended from said cable outside said station, and said coupling means comprises an endless belt means.

10. A transportation system comprising:
    a. a vehicle movable along a linearly extending track;
    b. a linear induction-motor means for propelling said vehicle along said track;
    c. a loading and unloading platform moving at a predetermined speed along a portion of said track parallel and immediately adjacent thereto; and
    d. a one-way mechanical coupling means operative between said vehicle and said platform for limiting the speed of said vehicle substantially to said predetermined speed at said portion to permit loading and unloading of said vehicle moving substantially at the speed of said platform.

* * * * *